United States Patent [19]

Uchidoi et al.

[11] 4,387,977
[45] Jun. 14, 1983

[54] POWER SUPPLY DEVICE FOR CAMERA

[75] Inventors: Masanori Uchidoi, Yokohama; Hiroshi Aizawa, Kawasaki; Kazunobu Urushihara, Yokohama; Nobuyuki Suzuki; Masami Shimizu, both of Tokyo, all of Japan

[73] Assignee: Canon Kabushiki Kaisha, Tokyo, Japan

[21] Appl. No.: 85,230

[22] Filed: Oct. 16, 1979

[30] Foreign Application Priority Data

Oct. 23, 1978 [JP] Japan .................. 53-130828

[51] Int. Cl.³ .............................................. G03B 7/26
[52] U.S. Cl. ............................... 354/60 R; 354/60 E
[58] Field of Search ............... 354/60 R, 60 L, 60 E, 354/53, 50, 51, 266, 267, 60 A, 60 F

[56] References Cited

U.S. PATENT DOCUMENTS

| | | | |
|---|---|---|---|
| 3,879,137 | 4/1975 | Sakazaki et al. | 356/218 |
| 4,003,063 | 1/1977 | Takahashi et al. | 354/50 |
| 4,145,130 | 3/1979 | Shimizu et al. | 354/60 R X |
| 4,209,244 | 6/1980 | Sahara et al. | 354/60 L X |
| 4,239,358 | 12/1980 | Ohtsubo et al. | 354/60 E |
| 4,281,917 | 8/1981 | Kitagawa et al. | 354/60 E X |

Primary Examiner—G. Z. Rubinson
Assistant Examiner—W. J. Brady
Attorney, Agent, or Firm—Toren, McGeady and Stanger

[57] ABSTRACT

The disclosed camera power control devices operate with a camera in which a first switch responds to initial movement of a shutter release member, and a second switch responds to further movement of the release member. In the power control device, turning the first switch on energizes the light metering and display circuits, and turning on the second switch supplies an exposure control circuit such as a shutter control circuit with electrical energy. The power control device is provided with an electrical timer circuit, and a selection arrangement operates to selectively actuate the timer circuit when the release member is returned to its rest position and the first switch changes is state from ON to OFF. During a period of time determined by the timer circuit, power continues to be supplied to operate the light metering and display circuits.

4 Claims, 2 Drawing Figures

POWER SUPPLY DEVICE FOR CAMERA

BACKGROUND OF THE INVENTION

1. Field of the Invention

This invention relates to a power or battery drain control device for a camera, which device makes it possible to supply electrical current to the light metering and exposure value display circuits in the camera by a prescribed necessary time.

2. Description of the Prior Art

The conventional use of a photo-conductive element in combination with a correction resistor and a galvanometer is usually sufficient to measure the intensity of light in a photographic camera. When the battery drain control switch is left on due to forgetfullness of the operator, therefore, the battery never suffers a rapid drain of its electrical energy, because the load on the battery is very small.

However, because the photo-conductive element does not have good light response characteristics including such linearity as may be desired to improve the accuracy of the light measurement, there is a recent trend to employ a silicon photo-cell in its place. This silicon photo-cell has a characteristic feature which can be utilized to its full extend when in a zero-bias drive condition, or to logarithmically compress the intensity of the light sensed. For this purpose, use is made of an operational amplifier device. This, however, greatly increases the rate of consumption of electrical energy from the battery. Thus, it is very possible that when the battery is allowed to remain connected to the photocell, it will be drained of its electrical energy entirely in a few hours, or a few days.

In order to prevent accidental wasteful consumption of the electrical energy of the battery, the following three methods have been proposed. According to the first proposal, the power supply control switch is arranged to be opened when the film winding lever is retracted from its working position. According to the second method, the switch is arranged to cooperate with the shutter release button. According to the third method, the battery is associated with a timer responsive to actuation of the release mechanism of the camera for controlling the period of energization of the light metering circuit and the like.

However, these conventional methods have many disadvantages. In the first method, when a sequence shooting is repeated frequently, the retracting movement of the film winding lever above the camera body followed by advancement of the lever to the working position upon each exposure is very troublesome to perform. Therefore, the operator lets the lever remain at the working position. Then, the resultant wasteful consumption of electrical energy amounts to a considerable level. Further, there is some possibility of the occurrence of the camera being put away with the lever advanced, with the result that the life of the battery ends soon afterwards.

In the second method, the removal of the operator's finger from depressing the release button is assuredly followed by the cutoff of the power supply, so that an advantage is provided in that the necessary manipulation of the power supply control switch cannot be overlooked. But, when both of the operator's hands are placed on other operating members, for example, the distance adjusting ring in the left hand and the grasp rod of the tripod in the right hand to obtain desired framing, it is impossible to make use of the exposure information at the same time.

The third method has a disadvantage arising from the fact that each time the release button is more or less actuated, the timer is rendered operative. After the exposure value is observed by looking through the finder, the once half-depressed release button may be returned so that no exposure follows. In this case, the timer operates also with the supply of power for no purpose. Thus, a wasteful consumption of electrical energy results.

Another disadvantage is that since the timer starts to operate at the time of the initial depression of the button, on the assumption that the prescribed timing period is 15 seconds, when the release button is allowed to return after a 10 second period of depression, the remaining period of the power supply is 5 seconds so that there is no longer sufficient time available, particularly when the photographer uses his hands in adjusting the other members of the camera, as has been mentioned above. Thus, the photographer is hampered from making an exposure at the proper time, and will be unable to obtain the benefits of all the features of the camera.

SUMMARY OF THE INVENTION

The present invention has for its general object to eliminate the above mentioned drawbacks, and to provide an electrical power supply control device for a photographic camera of the type having a first switch responsive to a first stroke or movement of the release button for supplying light metering, computing and displaying circuits with electrical energy, and a second switch responsive to a second, further stroke of the release button for actuating the camera shutter mechanisms, wherein the device includes an electronic timer circuit for holding the light metering, exposure value computing and displaying circuits in energized states for a prescribed time, and a third switch for controlling the actuation of the electronic timer circuit so that when the third switch is closed, the actuation of the electronic timer circuit coincides with the closure of the first switch.

Other objects and features of the present invention will become apparent from the following detailed description of an embodiment thereof taken in conjunction with the accompanying drawings in which:

DESCRIPTION OF PREFERRED EMBODIMENTS

Figure 1:
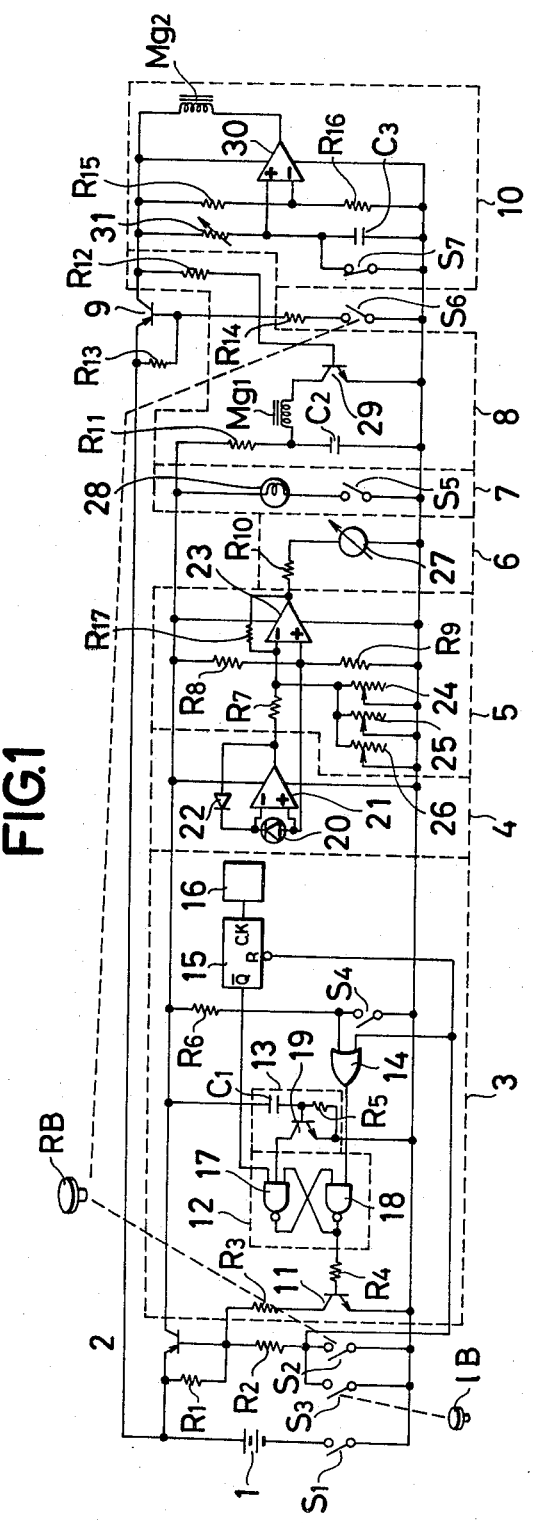
FIG. 1 is an electrical circuit diagram of an embodiment of an electrical power supply control device according to the present invention in association with an exposure control circuit of a camera.

The present invention is described with respect to a preferred embodiment thereof by reference to the drawings. In FIG. 1, there is shown camera circuitry including a power supply control device according to the present invention. An electrical power source or battery 1 is connected in series with a main switch S1. The battery 1 is connected through a switching transistor 2 to a timer circuit 3, a light sensing circuit 4, an exposure value computing circuit 5, a display circuit 6, a lamp circuit 7, and a portion of an electromagnetic release actuating circuit 8. Further, the battery 1 is connected through a second switching transistor 9 to the remaining portion of the actuating circuit 8 and a shutter control circuit 10. The above described transistor 2 has a resistor R1 connected in the emitter-base path thereof, and its base is connected through a resistor R2 to a light metering control switch S2. The switch S2 is arranged to be closed when a release button RB is initially depressed through a first stroke or movement. Thus, the transistor 2 is turned on. Another light metering control switch S3 is connected in parallel to the switch S2, and arranged to be closed when a control button IB is depressed independently of the above described release button. Also connected to the base of the above described transistor 2 is the collector of a transistor 11 in the output stage of the timer circuit 3.

The timer circuit further includes a flip-flop circuit 12, a power-up clear circuit 13, an OR gate 14, a counter 15, a pulse generating circuit 16 and a switch S4. The flip-flop circuit 12 is formed from NAND gates 17 and 18 with the output of each gate connected to an input of the other. The output of the NAND gate 18 is connected through a resistor R4 to the base of the transistor 11, thereby the ON and OFF operation of the transistor 11 is controlled. When the transistor 11 is ON, the transistor 2 is set to the ON state. The above described power-up clear circuit 13 is formed from a capacitor C1 and a resistor R5 connected in series to each other and from a transistor 19 with its base connected to the junction of the capacitor C1 and resistor R5 and with its collector connected to another input of the NAND gate 17. The OR gate 14 whose output is connected to another input of the NAND gate 18 connected at its first input to the connection point between the resistor R2 and the switch S2, and at its second input to a connection point between a resistor R6 and a timer setting switch S4 which are connected in series to each other between positive and negative buses of the power supply. The counter 15 has its output terminal Q connected to another input of the NAND gate 17 and has a clock pulse input terminal C.K. to which a clock pulse train from the pulse generating circuit 16 is applied. The reset terminal R of the counter 15 is connected to the connection point between the above described resistor R2 and switch S2.

The light sensing circuit 4 comprises a photo-sensitive element 20 connected across two inputs of an operational amplifier 21, and a diode for logarithmic compression connected in the feedback network of the operational amplifier 21. The output of the operational amplifier 21 serves as the output of the light sensing circuit and is applied through a resistor R7 to an operational amplifier 23 at a first input thereof. Also connected to the first input of the operational amplifier 23 are three variable resistors 24, 25 and 26 for setting a desired shutter time, the sensitivity of the film being used and a fully open aperture correction factor, respectively. Applied to a second input of the operational amplifier 23 is the output of a voltage divider of resistors R8 and R9. The output of the operational amplifier 23 is applied through a resistor R10 to a meter 27 in the display circuit 6, the position of the deflected meter pointer representing an exposure value, in this instance, a diaphragm value. One input terminal (+) of amplifier 21 is connected to the connection point of resistors R8 and R9, and resistor R17 is connected in the feedback network of the amplifier 23. The lamp circuit 7 comprises a lamp 28 positioned so that, upon energization, it illuminates the pointer and the diaphragm scale, and a switch S5 connected in series to the lamp 28.

The actuating circuit 8 comprises a series connected circuit of a resistor R11 and a capacitor C2 between the positive and negative buses, a magnetic winding Mg1 for controlling the actuation of the camera mechanisms and connected at one end to the junction of the resistor R11 and the capacitor C2, and a transistor 29 with its collector connected to the opposite end of the magnetic winding Mg1, with its emitter connected to the negative bus and with its base connected through the resistor R12 to the collector of the above described transistor 9. When the transistor 9 is turned on, the transistor 29 is turned on to permit the charge stored on the capacitor C2 to be suddenly drawn through the magnetic winding Mg1. The transistor 9 has a resistor R13 connected in the emitter-base path thereof and has its base connected through a resistor R14 to a switch S6 which is arranged to be closed when the release button RB is depressed from the first to the second stroke.

The shutter control circuit 10 whose positive bus is connected to the collector of the transistor 9 comprises a variable resistor 31 operatively associated with the above described variable resistor R24, a timing capacitor C3 connected in series to the resistor 31, a comparator 30 having a (+) input connected to the junction of the resistor 31 and capacitor C3, and a (−) input connected to the junction of resistors R15 and R16, and a magnetic winding Mg2 connected to one end to the output of the comparator 30, and at the opposite end to the positive bus. Connected across the timing capacitor C3 is a count start switch S7. This switch S7 is opened when the shutter is opened. When the magnetic winding Mg2 is deenergized, the shutter is closed.

Figure 2:
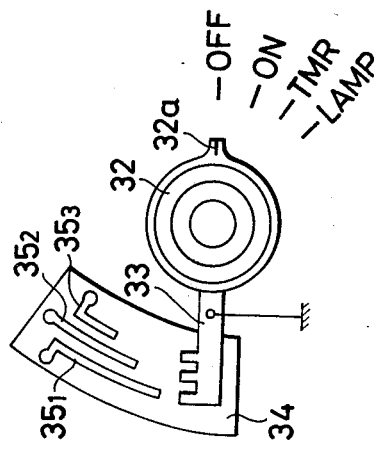
FIG. 2 is a schematic view of an assembly of switch elements of FIG. 1.

FIG. 2 shows an assembly of the switches S1, S4 and S5 having a common operating member or dial 32 positioned on the camera housing to be accessible from the outside thereof. This dial 32 carries an index 32a for alignment with any one of four symbols "OFF", "ON", "TMR", and "LAMP", and is mounted on a shaft from which an arm 33 extends radially. This arm is grounded and has three brushes arranged on the surface of a substrate 34 to slidingly move to contact with electrodes $35_1$, $35_2$ and $35_3$ which serve as the fixed contacts of the switches S1, S4 and S5 respectively, as the dial 32 is turned to place the index 32a in registry with either of the symbols "ON", "TMR" and "LAMP" respectively.

The operation of the camera of FIGS. 1 and 2 is as follows:

Explanation is first given to a mode in which the timer is not used. In this mode, the dial 32 is turned to the position "ON" where the brush 33 contacts with the electrode $35_1$ only, so that the switch S1 is closed while the other switches remain open.

Then, a film speed dial (not shown) is turned to set the sensitivity of the film being used in the variable resistor 25. Next, a shutter dial (not shown) is turned to select a desired shutter time, thereby the resistance values of the two variable resistors 24 and 31 are adjusted. The resistance value of the fully open aperture correction factor setting resistor 26 is automatically adjusted in response to the attachment of an interchangeable lens to the camera.

When the release button RB is initially depressed through the first stroke, the switch S2 is closed to turn on the transistor 2, thereby the timer circuit 3, light sensor 4, computer 5, meter 6 and storage capacitor C2 are supplied with electrical energy from the battery 1.

Then, responsive to the output of the photo-sensitive element 20, the operational amplifier 21 produces an output proportional to the logarithm of the object brightness level which is combined by the operational amplifier 23 with the above mentioned various exposure factors from the resistors 26, 25 and 24. The computed proper exposure value or diaphragm value is displayed by the meter 27.

Such closure of the switch S2 also causes the potential at the junction of the switch S2 and the resistor R2 to be reduced, and therefore, causes the counter 15 to be reset due to the appearance of a low level voltage at the reset terminal R thereof. Thus, the output Q of the counter 15 assumes a high level. At the same time, the charge on the capacitor C1 starts to flow to that the transistor 19 is temporarily turned on. Then, the output of the NAND gate 17 is changed to a high level. Since, on the other hand, the switch S4 is not closed yet, and therefore, the output of the OR gate 14 remains at a high level, the output of the NAND gate 18 is changed to a low level. Thus, the flip-flop circuit 12 is held in the initial state, that is, with the output of the NAND gate 18 at the low level.

Upon further depression of the button RB through the second stroke, the switch S6 is closed, so that the magnetic winding Mg2 in the shutter control circuit 10 is energized to latch the closing blade of the shutter. At the same time, the transistor 29 is turned on to permit the charge on the capacitor C2 to be discharged through the magnetic winding Mg1. Then, the magnetic flux of a permanent magnet is cancelled out by that of the energized magnetic winding Mg1 to release a latching mechanism of the opening blade of the shutter. Thus, the shutter is opened to initiate an exposure of the film, and, at the same time, the switch S7 is opened. In a time interval dependent upon the resistor 31 and the capacitor C3, the comparator 30 changes its output from the low to the high level whereupon the magnetic winding Mg2 is deenergized to terminate the exposure.

Then, when the operator's finger is removed from the release button RB, the switch S6 is opened to turn off the transistor 9, which is followed by the opening of the switch S2. At this time, though the voltage at the reset input R of the counter 15 is changed to the high level, the NAND gate 18 holds the low level, and the flip-flop circuit 12 holds the initial state. Therefore, the transistor 11 remains non-conducting so that no more supply of power results. Thus, at the same time, as when the release button is returned to its rest position, the power supply is cut off as the transistor 2 is turned off by the opening of the switch S2.

It is to be noted that when the operator desires to observe or read out the computed diaphragm value, but not to proceed to make an exposure, he need only stop the depression of the release button RB upon the first stroke. Such presentation of the exposure value display can be otherwise effected by depressing the light meter control button 1B instead of the release button RB.

Explanation will next be given to a mode where the timer is in use. The selection of this mode will be encountered, for example, when the operator desires to take account of the exposure value while simultaneously putting his left hand on the focusing ring of the lens and his right hand on the grasp of the tripod.

To select this mode, the operator first turns the dial 32 to place the index 32a in registry with the symbol "TMR", thereby the brush 33 is brought into contact with the electrodes $35_1$ and $35_2$. Thus, the switches S1 and S4 are closed. The setting of the various exposure factors are performed in a similar manner to that described in connection with the timer-out-of-use mode. When the release button RB is depressed through the first stroke, the switch S2 is closed to present a display of the computed exposure value by the meter 27. Since, at this time, the switch S4 is closed, both of the inputs of the OR gate 14 are of low level, causing the flip-flop 12 to be set, that is, the output of the NAND gate 18 to be changed to the high level, and therefore, causing the transistor 11 to be turned on. By this, the conduction of the transistor 2 is prevented from being interrupted when the operator removes his finger from the release button RB. That is, as the operator turns to move, for example, his right hand off the release button RB to readjust the camera angle as has been mentioned above, the release button RB is returned to permit opening of the switch S2. When the switch S2 is opened, the input voltage at the reset terminal R of the counter 15 changes from the low to the high level. Then, the counter 15 is set to count clock pulses from the pulse generator 16. In a predetermined time, the counter 15 changes its output Q from the high to the low level at which time the flip-flop circuit 12 is changed from the set state to the reset state, causing the transistor 11 to be turned off, and therefore, causing the transistor 2 to be turned off. Thus, the duration of battery drain is ended.

Therefore, it is to be understood that the presentation of a display of the exposure value is assured over the prescribed time with the advantage that the operator may otherwise use his two hands while simultaneously observing the effective exposure value in the field of view of the finder.

Instead of the release button RB, the light meter control button 1B may be used to effect an equivalent result so that when the switch S2 is closed by the release button RB. For this reason, the control button 1B is positioned near the lens mount to facilitate a simultaneous focusing operation.

If the given photographic situation is so dark that the displayed exposure value cannot be observed clearly, the operator will turn the dial 32 to place the index 32a in registry with the symbol "LAMP", where the brush 33 contacts all the electrodes $35_1$, $35_2$ and $35_3$. Thus, all the operation proceeds in a manner similar to that described above except that the pointer of the meter 27 and the diaphragm value scale are illuminated by the energized lamp 28.

With the camera switched in the timer-in-use mode, regardless of whether or not the lamp is lighted, when the release button RB is fully depressed, the shutter is actuated so as to open. In this case, however, after the exposure has been completed and the release button RB is returned to its initial rest position, the timer circuit 3 is rendered operative, causing the operation of the exposure value display to continue for the prescribed time with wasteful consumption of electrical energy. To avoid this, the operator need only turn the dial 32 to the OFF position.

It will be seen from the foregoing that the present invention minimizes the consumption of electrical energy by allowing for the use of the timer only when necessity arises such as to enable the operator to manipulate the camera with his two hands free from the exposure meter control button, while nevertheless permitting the exposure value to be simultaneously observed. If repeated actuation of the timer is necessary, since the release button and the first meter control button are located, for example, within the working range of the right hand of the operator, and the second meter control button, namely, 1B, is located within the working range of the left hand, the operator can work with either of the buttons, thus, the ease of handling the camera is further improved. Further, the timer is also used in controlling the duration of energization of the illumination lamp so that after the camera is used in dark lighting situations, for example, in night photography, even when the operator forgets to switch off the lamp, rapid drainage of the electrical energy of the battery does not occur.

Further, since initiation of an operating cycle of the timer coincides with the termination of actuation of the first or second meter control button, there is available sufficient time for later readjustment of the camera. Therefore, the operator will not be hampered during continued operation of the camera as would occur with the prior timing circuits.

While embodiments of the invention have been described in detail, it will be evident to those skilled in the art that the invention may be embodied otherwise without departing from its spirit and scope.

What is claimed is:

1. A camera, comprising:
   (a) a movable release member;
   (b) a first switch for actuation in response to a first movement of the release member from its rest position;
   (c) shutter means actuated in response to a second movement of the release member;
   (d) a first circuit including at least a photographic information forming circuit for producing a photographic information signal and an indicator for indicating photographic information on the basis of the photographic information signal;
   (e) power applying means for applying power from a power source to said first circuit when the first switch is actuated;
   (f) a timer circuit connected to said power applying means to perform a time counting operation in response to the operation of said first switch;
   (g) a holding circuit for holding said power applying means operative independent of the state of the first switch in response to an output of the timer circuit and for causing said power applying means to continue to supply the power to the first circuit during a period of time defined by said timer circuit even after the release member has returned to the rest position thereof;
   (h) illuminating means for illuminating said indicator from said power applying means when said power applying means is operative; and
   (i) selecting means for selecting an operation of said illuminating means so that said illuminating means becomes operative only when said selecting means selects the operation of the illuminating means.

2. A camera according to claim 1, wherein said photographic information forming circuit of said first circuit is a light measuring circuit, and said first circuit further includes an exposure information setting circuit and a computing circuit for computing the outputs of said light measuring circuit and said setting circuit, said indicator being arranged to indicate the output of said computing circuit.

3. A camera according to claim 1, further including a second switch parallel to said first switch, said second switch being arranged to be actuated by a manual operating member independently of the release member.

4. A camera, comprising:
   (a) a first circuit including at least a photographic information forming circuit for producing a photographic information signal and an indicator for indicating photographic information on the basis of the photographic information signal;
   (b) a shutter release actuating means movable through a first position to a second position from a rest position by operating said actuating means;
   (c) a first switch arranged to be changed from a first state to a second state when said shutter release actuating means is moved to a first position;
   (d) power supply means for supplying power to said first circuit when said first switch is in the second state;
   (e) a timer circuit coupled to said power supply means for allowing said power supply means to be operative for a predetermined period of time independent of the state of said first switch, said timer circuit being arranged to become operative in response to the operation of the first switch;
   (f) illuminating means for illuminating said indicator when said power supply means is operative; and
   (g) a manually operative selection member, said member having a first position to place the timer circuit in an inactive state, a second position to place the timer circuit in an operative state and a third position to make the timer circuit and the illuminating means operative, said operating member further being shifted from the first position through the second position to the third position by operating the operating member.

* * * * *